United States Patent Office 3,321,498
Patented May 23, 1967

3,321,498
SULFONATION OF EPOXY ALKYL ESTERS OF TERTIARY MONOCARBOXYLIC ACIDS BY MEANS OF BISULFITE ADDUCTS OF ALKYL ALDEHYDES AND KETONES
Cornelis Kortland and Cornelis Borstlap, Amsterdam, Netherlands, assignors to Shell Oil Company, New York, N.Y., a corporation of Delaware
No Drawing. Filed Nov. 8, 1963, Ser. No. 322,539
Claims priority, application Netherlands, Nov. 28, 1962, 286,064
4 Claims. (Cl. 260—400)

This invention relates to a process for the preparation of aliphatic hydroxysulfonic acids and salts thereof by reaction of epoxy compounds with the bisulfites.

The aliphatic hydroxysulfonic acids and their salts are known to be valuable detergents and wetting agents. However, methods heretofore used for their preparation often are found to be unsatisfactory due to the slow reaction rates of the processes involved.

It has now been found that aliphatic hydroxysulfonic acids and their salts may be prepared by a process in which excellent yields of the desired products are obtained in a fraction of the time heretofore necessary.

In accordance with the process of this invention aliphatic hydroxysulfonic acids and/or the salts thereof are prepared by reacting an epoxy compound with an addition product of a bisulfite and an oxo compound. More particularly the process of this invention comprises the reaction of an epoxide selected from the group consisting of epoxyalkanes, epoxyalkyl ethers, and epoxyalkyl esters of carboxylic acids with an addition product of a bisulfite and an oxo compound selected from the group consisting of aldehydes and ketones.

"Epoxy compounds" are here taken to mean compounds containing the oxirane ring.

The epoxy compound used as starting material according to this invention generally contains at least 7 carbon atoms. Though the process of the invention can also be applied to epoxy compounds with less than 7 carbon atoms, the new method will generally be applied to such compounds only in special cases, since as a rule such compounds already react sufficiently rapidly with bisulfites in the absence of the addition compound in question. The invention is applied with particular advantage to the conversion of higher epoxy compounds, which contain, for instance, from 8 to 30 carbon atoms and, in particular, from 11 to 25 carbon atoms in the molecule. Suitable epoxy starting materials comprise the aliphatic epoxides, which may, if desired, contain substituents, such as for example aryl groups, and, in particular, ether or ester groups. Particularly suitable epoxy starting materials comprise the epoxides derived from alpha-olefins, epoxy alkyl ethers, and epoxyalkyl esters, such as the 2,3- or 3,4-epoxybutyl derivatives and, in particular, the suitable glycidyl ethers and esters. Examples of such suitable starting materials are: the vic-epoxyalkanes, as 1,2-epoxydodecane and 1,2-epoxyoctadecane; glycidyl ethers having the empirical formula

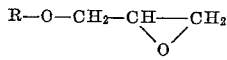

where R stands for an aliphatic chain of 5 to 27 carbon atoms such as isoamyl, 4-methyl-2-pentyl, 3-heptyl or n-hexadecyl. Preferred starting materials comprise the epoxyalkyl esters of carboxylic acids, especially of aliphatic or araliphatic, saturated monocarboxylic acids, which may be branched or unbranched. Particularly valuable products are obtained by the use as the epoxy starting material of epoxyalkyl esters of monocarboxylic acids having a tertiary or quaternary carbon atom in alpha-position in relation to the carboxyl group. Acids with 8 or more carbon atoms, and particularly those with at least 12 and at most 24 carbon atoms are especially suitable. Particularly preferred are the epoxyalkyl esters of tertiary monocarboxylic acids prepared by reaction of hydrocarbons with formic acid, or with carbon monoxide and water, in the presence of liquid acid catalysts, such as complexes consisting of phosphoric acid, boron trifluoride and water. The preferred hydrocarbon starting materials for the preparation of the tertiary monocarboxylic acids are olefin mixtures obtained by cracking processes and having, for instance, 7 to 24 carbon atoms. The epoxyalkyl esters of the suitable carboxylic acids are prepared by methods known for this purpose, an example being the reaction of the sodium salts of the appropriate acids with an epoxyalkyl halide, such as epichlorohydrin. In many cases it is advantageous to form the desired epoxy compound in situ, from the chlorohydrin, in the reaction medium from which the sulfonic acid is to be prepared. Hydrogen chloride formed is removed, for instance by means of an alkaline agent, for example aqueous sodium hydroxide.

The material reacted with the epoxy compound in accordance with the invention is an addition product of a bisulfite and an oxo compound.

In general, suitable oxo compounds comprise the aldehydes and ketones, especially the aliphatic, saturated representatives thereof, and, in particular, those with not more than 7 carbon atoms in the molecule. Suitable aldehydes include for instance, formaldehyde, acetaldehyde and propionaldehyde, butyraldehyde, etc. Of the ketones, preference is given to those which contain at least one methyl group directly attached to the keto group, for example the methyl lower alkyl ketones as acetone, methyl ethyl ketone, methyl isobutyl ketone, and the hydroxy-substituted derivatives thereof, as 4-methyl-4-hydroxy-2-pentanone (diacetone alcohol) and the like. Particularly preferred as the oxo-reactant is dimethylketone.

The addition product of an oxo compound and a bisulfite used as starting material in the process of the invention may be prepared by reacting the bisulfite of an alkali metal, of an alkaline earth metal, or of ammonia with a ketone or aldehyde. In this reaction the bisulfite adds to the >C=O group of the ketone or aldehyde, the salt of the hydroxysulfonic acid being formed; for example the sodium salt of 2-hydroxypropane-2-sulfonic acid is formed from sodium bisulfite and acetone. Such hydroxysulfonic acids, and/or the salt thereof, may be synthesized by any other method suitable for this purpose. The compounds thus produced are designated herein by the term "addition products." In accordance with the invention these addition products are usually applied in the form of their alkali metal salts or ammonium salts, the sodium and potassium salts generally being preferred for this purpose. Salts having other cations may, however, be employed within the scope of the invention.

According to the invention the addition product is reacted with the epoxy compound, generally in the presence of a solvent and/or dispersant and at an elevated temperature. For example, the addition product may be used as such, for instance by mixing it directly with the epoxy compound or by gradual addition to the reaction mixture during the course of the reaction. However, the addition compound may be formed in situ; the simplest method being the execution of the reaction in the presence of both the bisulfite and the oxo compound. Instead of the bisulfite, such as $NaHSO_3$, the corresponding metabisulfite may be used, for instance $Na_2S_2O_5$, which is commercially obtainable in a pure state and which is converted in water to the bisulfite. Greatest increase in reaction rate is produced if the addition product is used as such.

As a rule the reaction according to the invention is caused to take place in a medium in which the reaction components are soluble or dispersible. Suitable solvents are mixtures of water and alcohols, such as alkanols having from 1 to 4 carbon atoms, for example, methanol, and, in particular, ethanol and/or n-propanol. A factor in determining the choice of preferred solvent, and in this case the percentage of water therein, is the solubility of the epoxy compound applied. Excellent results are obtained with ethanol/water mixtures containing from about 20–65% by volume, in particular of about 30–55% by volume, of ethanol. The preferred amount of solvent, or dispersant employed is dependent to some extent on the components of the reaction. In most cases a ratio of from about 10 to 30 parts by weight of the solvent to about one part by weight of the epoxide produces good results, in particular a ratio from 15:1 to 25:1.

Reaction temperatures particularly preferred will, among other factors, depend to some extent on the components used. Generally, about 40° C. to about 150° C. is suitable, and a range of about 60° C. to about 100° C. being preferred. The reaction proceeds smoothly at atmospheric pressure, but higher or lower pressures may also be applied.

According to a preferred embodiment of the invention the reaction components are first heated in the absence of any substantial amount of water and then contacted with water. It has been found that this procedure brings about a very considerable acceleration of the reaction. In many cases the entire conversion, including preheating, was completed within 40 to 50 minutes. Preheating is effected in the presence or absence of a solvent and in the presence of little if any water. Quantities of not more than about 10% of water as referred to the total reaction mixture are, however, not harmful. In the presence of a greater relative amount of water, however, the aforesaid effect does not occur. Generally, preheating is carried out at a temperature between about 40° C. and about 150° C., in particular between about 60° C. and about 100° C. The time required for preheating varies with, among other factors, the temperature applied, and also the particular components, especially the epoxy compound, present. Preheating for about 10 to about 100 minutes is generally sufficient. After water addition, over a period of for example between 20 to 60 minutes, heating is continued, for instance at 60 to 100° C., and, if desired, the solvent and/or the oxo compound is removed by distillation.

It has proved to be advantageous to allow the epoxy compound to react with an excess of the addition product of the bisulfite and the oxo compound and/or of the components thereof. In general, an excess of not more than about 8 moles of the addition product per mole of epoxide is used, and preferably from 4 to 6 moles of the addition product per mole of the epoxide.

The hydroxysulfonic acids produced according to the invention are obtained in the form of their salts. If desired, they can be liberated therefrom by acidification.

The products obtained by the process of the invention possess surface-active properties and are eminently suitable for use as detergents and/or wetting agents, either as produced or in combination with other compounds and additives customarily used for such purposes. Examples of such substances added to or combined with the products of the process of the invention comprise: other surface-active compounds, alkali pyro- or polyphosphates, silicates, carbonates, sulfates, borates, sodium carboxymethylcellulose or other soluble derivatives of cellulose or starch, persulfates, perborates, percarbonates, optical bleaches, foaming agents and foam-stabilizing substances. Especially the products obtained from epoxyalkyl esters have excellent cleansing properties and a high foaming power.

EXAMPLES

*Preparation of a mixture of glycidyl esters by reaction of epichlorohydrin with the sodium salts of $C_9$–$C_{11}$ acids obtained from cracked olefins*

A mixture of olefins havaing from 8 to 10 carbon atoms to the molecule, obtained by cracking paraffinic hydrocarbons, was reacted with carbon monoxide and water, in the presence of a catalyst complex consisting of phosphoric acid, boron trifluoride and water in the molar ratio of 1:1:1, to result in a mixture of aliphatic tertiary monocarboxylic acids having 9 to 11 carbon atoms to the molecule.

After being separated from the catalyst, the crude carboxylic acid mixture was neutralized with sodium hydroxide, after which the hydrocarbons still present in the solution of sodium salts in water were removed by extraction with gasoline. The concentration of the sodium salts of the mixture of $C_{9-11}$ tertiary monocarboxylic acids in the water solution was then adjusted to 50% by weight.

An amount of the latter solution, containing 2 moles of sodium salt of admixed $C_{9-11}$ tertiary monocarboxylic acids, was gradually added in the course of 2½ hours to 20 moles of epichlorohydrin, the temperature of the mixture formed being maintained between 105 and 110° C. During the reaction epichlorohydrin was distilled off azeotropically together with water. The distillate separated into two phases. One, the epichlorohydrin phase, was returned to the reactor. In this way the concentration of water in the reaction mixture was kept constant at about 2% by weight.

Upon completion of the reaction, excess epichlorohydrin was distilled off; first at normal pressure until the temperature at the bottom was 60° C., and finally at a pressure of 20 mm. of mercury at 120° C. The latter temperature and pressure were maintained for one hour. The crude reaction product remaining, consisting essentially of the admixed glycidyl esters of $C_{9-11}$ tertiary monocarboxylic acids, washed three times with 150 ml. of distilled water to remove NaCl. After removal of the water the remaining glycidyl ester was distilled in vacuo.

EXAMPLE I

*Reaction of the admixed glycidyl esters of $C_{9-11}$ tertiary monocarboxylic acids with the addition product of sodium bisulfite and acetone prepared in situ*

In a flask fitted with a reflux condenser and stirrer a mixture of 10.3 g. (42 mmoles) of the admixed glycidyl esters of aliphatic $C_{9-11}$ tertiary monocarboxylic acids prepared as described above, 11.6 g. (200 mmoles) of acetone and 19 g. (100 mmoles) of sodium meta-bisulfite was dissolved in 250 g. of a medium consisting of equal volumes of ethanol and water.

The mixture, while stirred, was boiled for an hour at a temperature of 85° C. After it had been cooled down the reaction mixture was diluted with water and then extracted with ether-pentane. From the resulting extract the ether and pentane were removed by distillation, after which the residue was taken up in boiling isopropanol and the solution filtered in order to remove any inorganic salt still present as thoroughly as possible. Finally, the solvent was distilled off. There was thus obtained as final product a hydroxy sulfonate composition consisting essentially of the admixed $C_{9-11}$ tertiary alkanoic monocarboxylic acid esters of 2,3-dihydroxypropane-sodium sulfonate, in the yield of 30% of the theoretical.

EXAMPLE II

The experiment described in foregoing Example I was repeated under substantially the same conditions, but without the addition of the acetone. No addition product of the acetone with the sodium metabisulfite could therefore be formed. Reaction time: 1 hour. In this case the yield of the hydroxy sulfonate product was only 19% of the theoretical yield.

EXAMPLE III

*Reaction of the admixture of glycidyl esters of $C_{9-11}$ tertiary monocarboxylic acids with the preformed addition product of sodium bisulfite and acetone*

Applying the same conditions as described in Example I, a mixture of 10.3 g. of the glycidyl esters of $C_{9-11}$ tertiary monocarboxylic acids prepared by the method described above, and 33.4 g. (200 mmoles) of the preformed addition product of sodium bisulfite and acetone was reacted in 250 g. of aqueous ethanol containing equal parts by volume of ethanol and water. Reaction time: 1 hour. In this case the yield of the hydroxy sulfonate product was 42% of the theoretical yield.

EXAMPLE IV

*Reaction of the admixed glycidyl esters of $C_{9-11}$ aliphatic tertiary monocarboxylic acids with the preformed addition product of sodium bisulfite and acetone-applying preheating in the absence of water*

10.3 g. (42 mmoles) of the same admixed glycidyl esters of $C_{9-11}$ tertiary monocarboxylic acids used in Example I and 33.4 g. (200 mmoles) of the preformed acetone-sodium bisulfite addition product were heated in 100 ml. of 96% ethanol for 20 minutes at 85° C. in a flask fitted with a reflux condenser, any ethanol passing overhead being replaced. Then 200 ml. of water was added to the mixture and the heating continued for another 25 minutes, the ethanol solvent and acetone being distilled off. The resulting mass was then cooled down to room temperature, poured into water and extracted with an ether-pentane mixture. After removal of the solvents 12.5 g. (37.8 mmoles) of the hydroxy sulfonate composition consisting essentially of the admixed $C_{9-11}$ tertiary alkanoic monocarboxylic acid esters of 2,3-dihydroxypropane-sodium sulfonate were obtained. The yield was 90% of the theoretical.

From this experiment the favorable effect of preheating is evident. Less than one hour of overall heating was applied.

We claim as our invention:

1. A process for the preparation of aliphatic hydroxy-sulfonic acids and their salts which comprises reacting epoxyalkyl esters of saturated aliphatic tert. monocarboxylic acids containing from 8 to 30 carbon atoms with the preformed addition product of a bisulfite and an oxo compound selected from the group consisting of alkyl aldehydes and alkyl ketones containing between 1 and 7 carbon atoms, at a temperature of from about 40° to about 150° C. in the presence of an aqueous alkanol having from 1 to 4 carbon atoms.

2. The process for the production of surface active compositions consisting essentially of admixed saturated $C_{8-24}$ aliphatic tertiary monocarboxylic acid esters of a 2,3-dihydroxypropane-sodium sulfonate which consists of reacting an admixture consisting essentially of glycidyl esters of saturated $C_{8-24}$ aliphatic tertiary monocarboxylic acids, in liquid phase, with the preformed addition product of sodium bisulfite and an oxo compound selected from the group consisting of alkyl aldehydes and alkyl ketones containing from 1 to 7 carbon atoms, at a temperature of from about 40° to about 150° C. in the presence of an aqueous alkanol having from 1 to 4 carbon atoms.

3. The process for the production of surface active compositions consisting essentially of admixed saturated $C_{9-11}$ aliphatic tertiary monocarboxylic acid esters of 2,3-dihydroxypropane-sodium sulfonate which consists of reacting an admixture consisting essentially of glycidyl esters of saturated $C_{9-11}$ aliphatic tertiary monocarboxylic acids, in liquid phase, with the preformed addition product of sodium bisulfite and acetone at a temperature of from about 40° to about 150° C. in the presence of an aqueous alkanol having from 1 to 4 carbon atoms.

4. The process according to claim 1 wherein the reactants are preheated in the absence of any substantial amount of water at a temperature of from about 40° to about 150° C.

References Cited by the Examiner

UNITED STATES PATENTS

| | | | |
|---|---|---|---|
| 3,067,220 | 12/1962 | Borstlap et al. | 260—400 |
| 3,082,249 | 3/1963 | Gaertner | 260—513 |
| 3,084,176 | 4/1963 | Dieckelmann et al. | 260—513 |
| 3,093,682 | 6/1963 | Sullivan | 260—513 |
| 3,102,893 | 9/1963 | Gaertner | 260—513 |
| 3,239,560 | 3/1966 | Cambre et al. | 260—513 |

LORRAINE A. WEINBERGER, *Primary Examiner.*

RICHARD K. JACKSON, *Examiner.*

MARY B. WEBSTER, *Assistant Examiner.*